United States Patent [19]
Popov et al.

[11] 4,255,680
[45] Mar. 10, 1981

[54] LINEAR INDUCTION MOTOR

[76] Inventors: Alexandr D. Popov, pereulok Rynochny, 44; Vladimir A. Solomin, ulitsa Dachnaya, 14, kv. 31, both of Rostov-na-Donu; Vladimir A. Trofimov, selo Kalakleya, pereulok Tikhy, 8, Cherkasskaya oblast, all of U.S.S.R.

[21] Appl. No.: 970,990

[22] Filed: Dec. 19, 1978

[51] Int. Cl.³ .............................................. H02K 41/02
[52] U.S. Cl. ....................................................... 310/13
[58] Field of Search ..................................... 310/12-14

[56] References Cited
U.S. PATENT DOCUMENTS

| | | | |
|---|---|---|---|
| 782,312 | 2/1905 | Zehden | 310/13 |
| 3,508,088 | 4/1970 | Davey | 310/13 |
| 3,579,001 | 5/1971 | Pelenc | 310/13 |

*Primary Examiner*—Donovan F. Duggan
*Attorney, Agent, or Firm*—Steinberg & Raskin

[57] ABSTRACT

A linear induction motor comprises an inductor made of individual cores with a concentrated polyphase winding placed thereupon and having legs connected by a yoke. A secondary element located on the leg butt side is provided with a magnetically conductive base intended to close the magnetic flux in the transverse direction with respect to the motion and whereon the main electrically conductive part is positioned. The butts of the lateral core legs have main chamfers on the inside, whereas respective surfaces of the main electrically conductive part of the secondary element are made congruent to the main chamfers of the butts of the lateral legs. In this case the magnetically conductive base has a surface congruent to respective surfaces of the main electrically conductive part.

2 Claims, 4 Drawing Figures

LINEAR INDUCTION MOTOR

FIELD OF THE INVENTION

This invention relates to electrical machines and, in particular, to linear induction motors.

The present invention can be used to produce thrust in devices for high-speed ground vehicles, as well as in conveyers and electric drives of machine tools with reciprocal motion of mechanisms.

The present invention can be most usefully be employed as an element for thrust or levitation in high-speed ground vehicles.

Linear induction motors produce adequate thrust and levitation forces. However, random lateral influence can disturb their operation due to absence of stabilization of the inductor in the transverse direction with respect to the motion.

PRIOR ART

Known in the art is a linear induction motor (cf., for example, British Pat. No. 1,373,054, Cl. H2A, 1974) comprising an inductor made of individual cores featuring a concentrated polyphase winding placed thereupon and having legs connected by a yoke and a secondary element positioned on the side of the leg butts, which is provided with a magnetically conductive base intended for closing the magnetic flux in the transverse direction with respect to the movement and whereon the main electrically conductive part is placed.

The cores of the inductor and the secondary element of the known induction motor are designed so that in case of lateral influence the trajectory of the inductor motion alters and its interaction with the secondary element is disturbed. The inductor position, therefore, cannot be stabilized in the transverse direction with respect to the motion of the inductor of the known motor, installed, for example, on a high-speed ground vehicle.

SUMMARY OF THE INVENTION

It is an object of this invention to increase stability of the inductor in the transverse direction with respect to the movement.

This is achieved by that in a linear induction motor comprising an inductor made of individual cores with a concentrated polyphase winding arranged thereupon and having legs connected by a yoke and a secondary element positioned on the side of butts of the legs, which has a magnetically conductive base intended for closing the magnetic flux in the transverse direction with respect to the inductor motion and whereupon the main electrically conductive part is situated, according to the invention, the butts of the lateral legs of cores have main chamfers on the inside, whereas respective surfaces of the main electrically conductive part of the secondary element are made congruent to the main chamfers of the butts of the lateral legs, the magnetically conductive base having a surface congruent to respective surfaces of the main electrically conductive part.

It is advisable that the butt ends of the side core legs be provided with additional chamfers on the outside, whereas the main electrically conductive part of the secondary element have two additional portions rigidly secured thereto and made congruent to the additional chamfers of the butts of the lateral legs, the magnetically conductive base of the secondary element having two elements for closing the magnetic flux in the direction of the inductor motion, which are arranged along the additional portions of the main electrically conductive part of the secondary element.

The proposed linear induction motor ensures reliable operation of devices of high-speed ground vehicles, in particular within the speed range of 500 km/hr and over with considerable lateral random influence (for example, wind gusts).

In this case stabilization of the inductor is attained without introduction of special-purpose stabilizing facilities, which does not raise the motor price.

BRIEF DESCRIPTION OF DRAWINGS

The invention will now be described in greater detail with reference to the accompanying drawings illustrating a specific embodiment thereof, wherein.

DETAILED DESCRIPTION OF THE INVENTION

Consider the use of a linear induction motor for high-speed ground vehicles.

Figure 1:
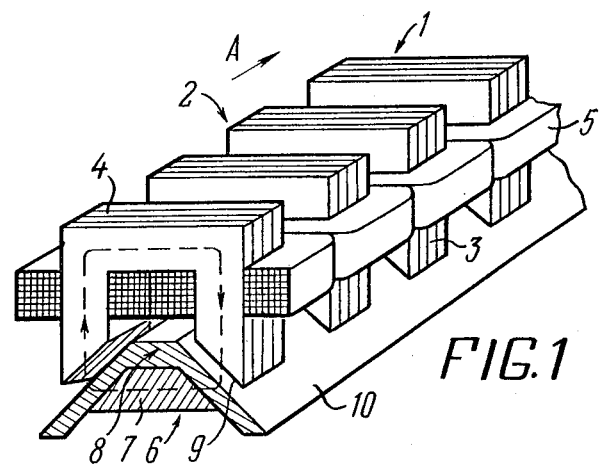
FIG. 1 illustrates an axonometric view of a linear induction motor wherein cores have two legs each with main chamfers on the inside, according to the invention.

A linear induction motor comprises an inductor 1 (FIG. 1) composed of individual cores 2 having lateral legs 3 connected by a yoke 4. The lateral legs 3 carry a concentrated polyphase winding 5. The linear induction motor also comprises a secondary element 6 positioned on the side of butt ends of the lateral legs 3 and provided with a magnetically conductive base 7 for closing the magnetic flux in the transverse direction with respect to the motion of the inductor 1 whereupon a main electrically conductive part 8 is located. The cores 2 have two lateral legs 3 each, the butt ends of each such leg 3 being provided with main chamfers 9 on the inside. Respective surfaces 10 of the main electrically conductive part 8 of the secondary element 6 are made congruent to the main chamfers 9 of the butts of the lateral legs 3. In this case the magnetically conductive base 7 has a surface congruent to respective surfaces of the main electrically conductive part 8.

Figure 2:
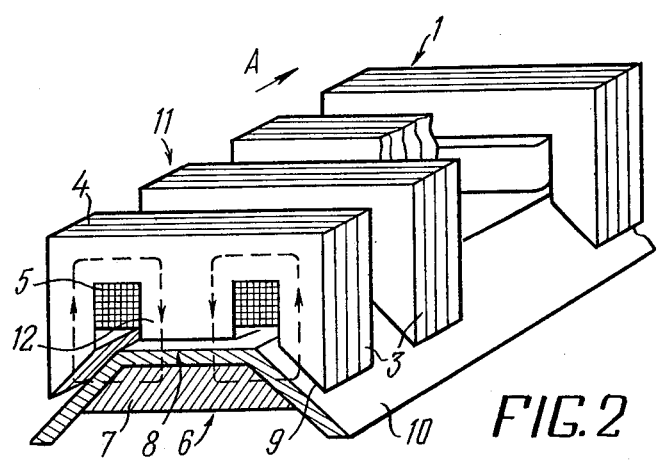
FIG. 2 illustrates an axonometric view of a linear induction motor in which cores have three legs each, the lateral legs having main chamfers on the inside, according to the invention.

Referring to FIG. 2, a linear induction motor features cores 11, each provided with a center leg 12 apart from the lateral legs 3. The main chamfers 9 are made on the inside of the butt ends of the lateral legs 3. Introduction of the center leg 12 leads to greater thrust effort and motor power. The number of center legs can be increased to suit the required power gain. The concentrated polyphase winding 5 is arranged upon the center legs 12 of the cores 2, but it can envelop each of the lateral and center legs 3 and 12.

Figure 3:
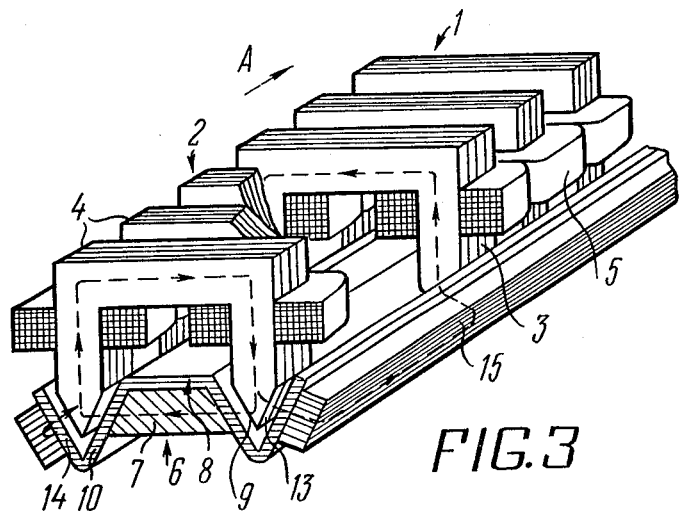
FIG. 3 illustrates a partial tear-out axonometric view of FIG. 1 in which cores have two legs each with main and additional chamfers on the inside and outside, according to the invention.

In a linear induction motor illustrated in FIG. 3 the inductor 1 is composed of cores 2 having two lateral legs 3 each. The butt ends of each leg 3 are provided apart from the main chamfers 9 with additional chamfers 13 on the outside.

The main electrically conductive part 8 of the secondary element 6 has two additional portions 14 rigidly secured thereto. These additional portions 14 are made congruent to the additional chamfers 13 of the butts of the lateral legs 3. The magnetically conductive base 7 of the secondary element 6 features two elements 15 for closing the magnetic flux in the direction of the motion, arranged along the additional portions 14 of the main electrically conductive part 8 of the secondary element 6.

Figure 4:
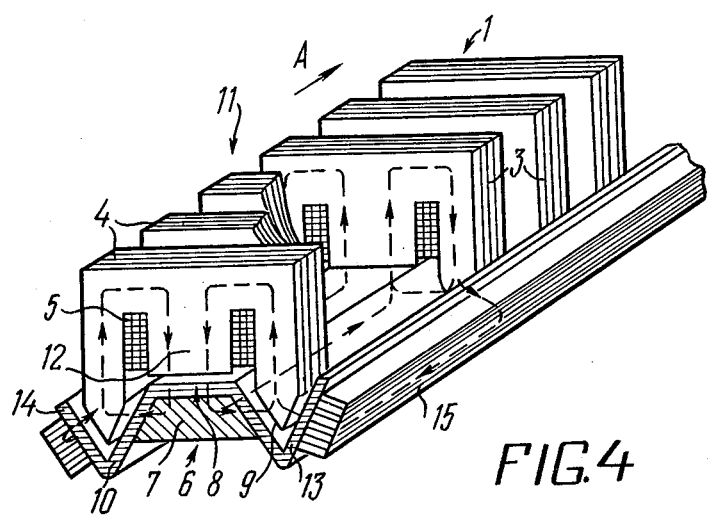
FIG. 4 illustrates a partial tear-out axonometric view of FIG. 2 in which the lateral legs have main and additional chamfers on the inside and outside, according to the invention.

In a linear induction motor of FIG. 4 the inductor 1 is composed of cores 11 having lateral legs 3 featuring main chamfers 9 and additional chamfers 13 on their butt ends and one center leg 12. Should the need arise, the number of center legs can be increased.

The linear induction motor operates as follows.

When the concentrated polyphase winding 5 (FIG. 1) of the inductor 1 is connected to an AC voltage source (not shown in drawings), a magnetic field travelling the direction of the motion of the inductor 1 is induced in the zone between the legs 3 and the surface 10 of the main electrically conductive part 8 of the secondary element 6. Under the influence of the traveling magnetic field electromotive forces are induced and currents flow in the main electrically conductive part 8 of the secondary element 6. The interaction of these currents and the traveling magnetic field results in thrust forces applied in the direction of the motion (indicated by the arrow A), as well as suspension forces applied in the direction perpendicular to the surface of the main electrically conductive part 8 of the secondary element 6. These suspension forces on the surfaces of the main chamfers 9 of the butt ends of the legs 3 can be presented as two components. One of them is directed vertically and takes part in creating magnetic suspension. The other horizontal component acts in the direction perpendicular to the direction of motion. The horizontal component of suspension forces acts in the direction from the surface 10 of the main electrically conductive part 8 of the secondary element 6 towards the surface of the main chamfers 9 of the butt ends of the legs 3. As the distance between the main chamfers 9 of the butt ends of the legs 3 and the secondary element 6 decreases, the horizontal components of levitation forces increase. In case of external lateral accidental influences, the distance between the main chamfers 9 of the butt ends of the legs 3 and the main electrically conductive part 8 of the secondary element 6 decreases on one side of the inductor 1, whereas the same distance on the other side of the inductor 1 increases. In this case forces are produced to oppose such accidental influences. In this way the inductor 1 is stabilized transversely in relation to the direction of motion.

When the cores 11 are provided with center legs 12 (FIG. 2), the motor operates in the same manner but the forces of thrust and levitation are greater. In this case the main electrically conductive part 8 of the secondary element 6 is affected only by vertical and longitudinal forces.

When main and additional chamfers 9 and 13 (FIGS. 3 and 4) are provided on the butt ends of the lateral legs 3 on the inside and outside, respectively, the horizontal components of levitation forces affect both the external and internal sides. The magnetic flux passes respectively through the cores 2 and 11, the additional portions 14 of the main electrically conductive part 8 and closes in the direction of motion via the elements 15 of the magnetically conductive base 7. In this case the stabilizing effect is even more apparent.

What is claimed is:

1. In a linear induction motor for generating thrust in a longitudinal direction comprising an inductor including a plurality of cores spaced from each other in the longitudinal direction, each of said cores comprising at least two transversely spaced, laterally extending legs having butt ends defining internal facing sides and external sides, and a transversely extending yoke interconnecting said at least two legs, a plurality of concentrated polyphase windings, each of said windings being arranged on a respective one of said cores, a longitudinally extending secondary element located in opposed relationship with the butt ends of said core legs, said secondary element including a first longitudinally extending electrically conductive member and a longitudinally extending magnetically conductive base on which said electrically conductive member is situated for closing the magnetic flux in the transverse direction, the improvement comprising:

the internal sides of said butt ends of said core legs being formed with main chamfers;

said first longitudinally extending electrically conductive member having main wall portions extending at an angle with respect to each other, respective ones of said wall portions extending substantially parallel to the chamfered internal sides of said core leg butt ends; and said magnetically conductive base having surface portions which are substantially congruent with said wall portions of said electrically conductive member.

2. The combination of claim 1 wherein the external sides of said butt ends of said core legs are formed with second chamfers; said electrically conductive member further including first and second additional wall portions integral with said main wall portions, said first and second additional wall portions extending substantially parallel to respective ones of the chamfered external sides of said core leg butt ends; and said magnetically conductive base further including first and second longitudinally extending elements for closing the magnetic flux in the longitudinal direction, said first and second longitudinally extending elements being substantially congruent with said first and second additional wall portions of said electrically conductive member.

* * * * *